May 10, 1949.　　　　　　C. T. PRATT　　　　　2,469,931
TRAILER TIRE DEFLATION SIGNAL
Filed Sept. 26, 1947　　　　　　　　　　　2 Sheets-Sheet 1
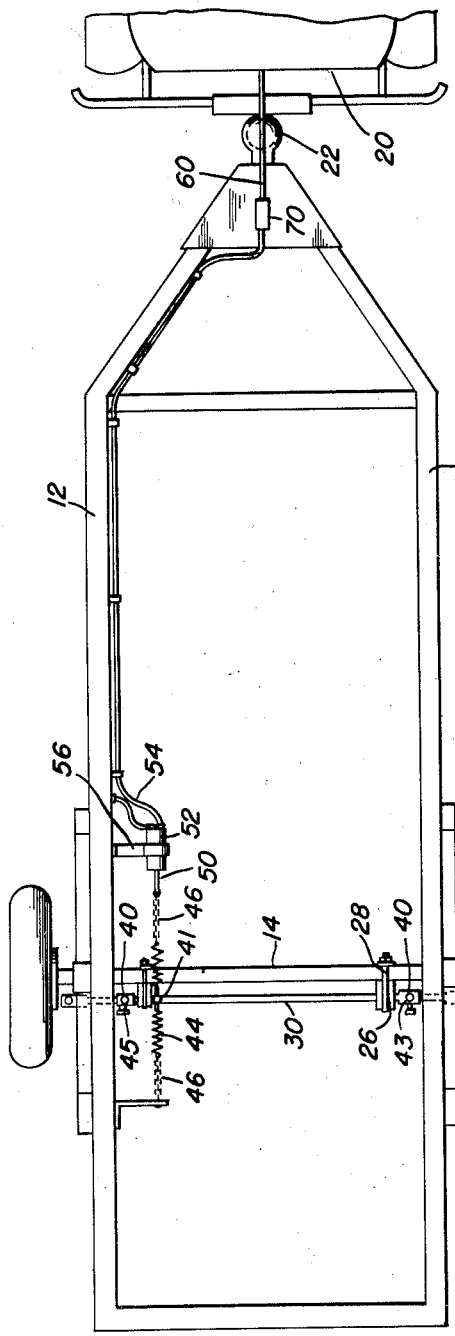
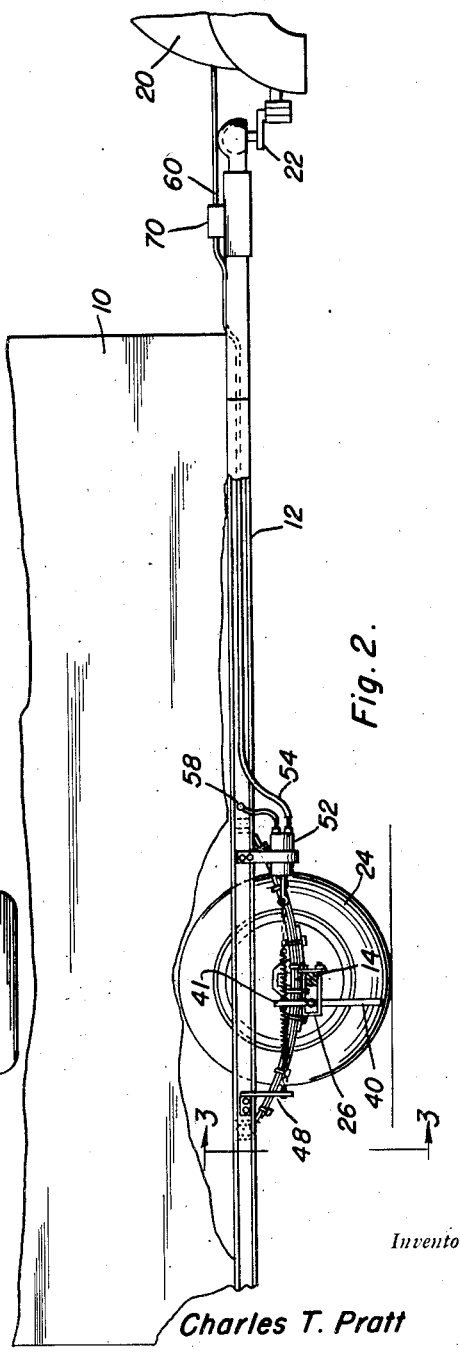
Inventor
Charles T. Pratt May 10, 1949.                C. T. PRATT                2,469,931
TRAILER TIRE DEFLATION SIGNAL
Filed Sept. 26, 1947                          2 Sheets—Sheet 2
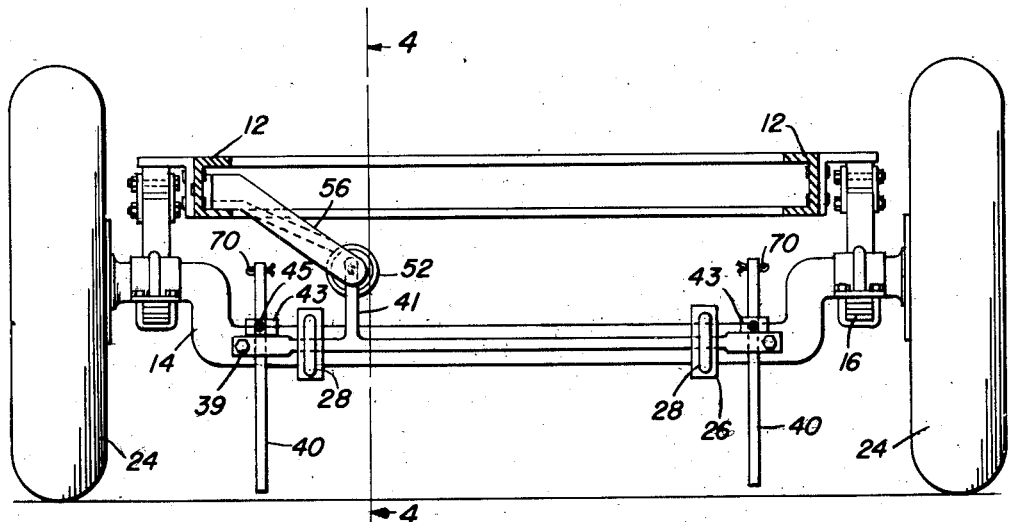
Fig. 3.
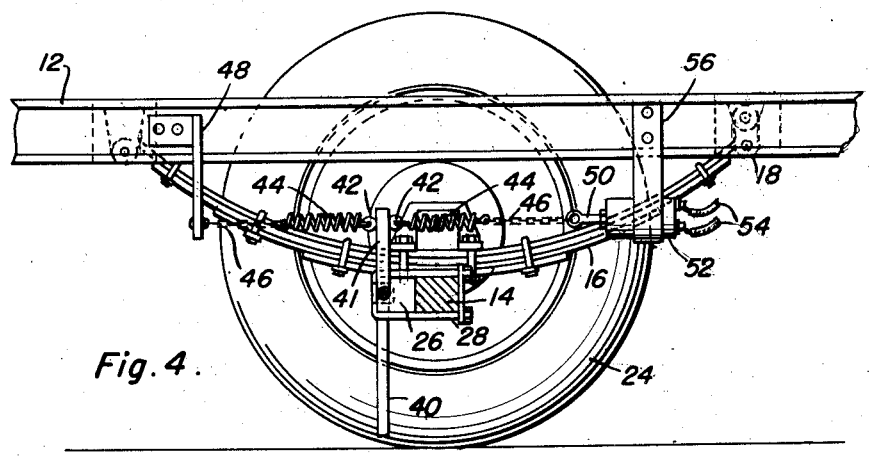
Fig. 4.
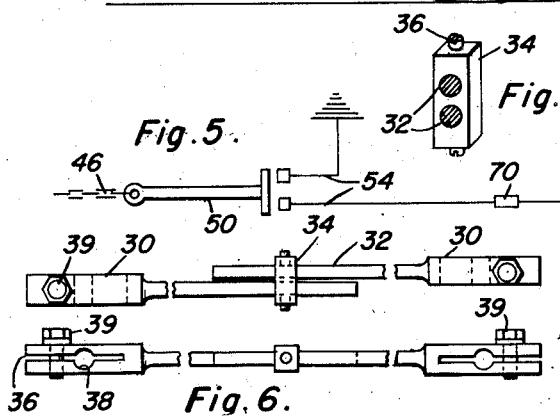
Fig. 5.
Fig. 6.
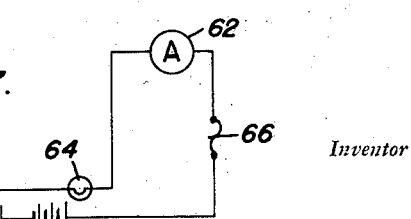
Fig. 7.
Inventor
Charles T. Pratt
By Clarence A. O'Brien
and Harvey B. Jacobson
Attorneys Patented May 10, 1949

2,469,931

UNITED STATES PATENT OFFICE 2,469,931

TRAILER TIRE DEFLATION SIGNAL

Charles T. Pratt, Solvay, N. Y.

Application September 26, 1947, Serial No. 776,361

3 Claims. (Cl. 200—58)

This invention relates generally to signalling devices, and more particularly to a tire deflation signal apparatus particularly well adapted for use with trailers having pneumatic tires, and comprising a depending arm or a plurality of such arms, suitably mounted on an axle or axles of the vehicle so that said arm or arms will contact the road surface when one or more of the tires becomes deflated to a predetermined extent, movement of the arm member concerned relative to the axle causing the closing of an electric circuit through a signalling device preferably secured on the dash of the operating vehicle.

The primary object of this invention is to provide means for signalling the driver of a vehicle including a trailer when the axle concerned has insufficient clearance from the road surface due to the partial or complete deflation of a tire.

Another salient object of this invention is to provide a device of this character in a form rendering the same easily attachable to a wide variety of vehicles, this versatility of the device being accomplished, in part, by the provision of a tie bar connecting the depending arms in a widely adjustable manner, the tie bar being preferably split, and the means for securing the tie bar pivotally upon an axle being designed to allow the securement of the device to a wide variety of axles.

Another object of this invention is to provide means of this character which is designed with a view to ruggedness and which will not be easily damaged even in the event of one of the arms contacting an obstruction in the road surface while the vehicle is moving in either a forward or reverse direction.

Still another object of this invention is to provide a device of this character which will repeatedly signal the partial or complete deflation of a tire, thus assuring that the notice of the driver of a vehicle will be attracted.

A still further object of this invention, ancillary to the preceding objects, is to provide signalling means which is easily interpreted in relation to the driver's knowledge of the character of the roadbed over which the vehicle is being moved. For example, operation of the signal by weeds or an easily noticeable upset portion of the roadbed will indicate to the driver only those conditions and will not lead to misinterpretation of the signal.

A last object to be specifically mentioned is to provide a device of this character which is relatively inexpensive and practicable to manufacture, extremely simple to install and use, and which will give generally efficient and durable service.

With these objects definitely in view, this invention resides in certain novel features of construction, combination and arrangement of parts and portions that will be hereinafter described in detail in the specification, particularly set forth in the appended claims, and illustrated in the accompanying drawings which form a material part of this application, and in which—

Figure 1 is a plan view of a portion of the chassis of a trailer with this invention operatively applied thereto, the figure including a fragmentary portion of the hauling vehicle;

Figure 2 is a side elevational view of the structure illustrated in Figure 1, with a portion of the body of the trailer being indicated;

Figure 3 is a rear elevational view of the same structure, the view being taken substantially from the line 3—3 of Figure 2;

Figure 4 is a vertical transverse sectional view taken substantially upon the line 4—4 in Figure 3 and designed particularly to show how the arm is pivotally secured to an axle and how the switch controlling the electric circuit is resiliently connected to the upper end of another arm, the view including a wheel and a fragmentary portion of the chassis.

Figure 5 is a diagrammatic view illustrating the possible arrangement of an electrical circuit for use with this invention;

Figure 6 is a grouped view showing the tie rod used to connect two depending arms adjustably, the view including an elevational and a top plan view of one of these adjustable tie bars with the hereinbefore mentioned depending arms secured therein; and Figure 7 is a perspective view of a block clamp member used to adjustably clamp the two portions of a tie bar together.

Similar characters of reference designate similar or identical parts and portions throughout the specification and throughout the several views of the drawings.

Referring now to the drawings in detail, this invention is adapted to be used with an environment including a trailer having a body portion 10, a chassis having side frame members 12, an axle 14, suspension springs 16 and spring knuckles 18 for securement of the suspension springs to the side frame members 12, together with a towing vehicle 20 which is ordinarily secured by means of a universal joint drawbar 22, to the trailer. Obviously, the type of trailer, and the type of towing vehicle is not material in this application and this invention is adaptable for use with a wide variety of vehicles. The invention is, however, particularly adapted for use with vehicles having pneumatic tired wheels 24.

The axle 14, or the axle housing if the same is provided, provides support for the major portions of this invention, and it is preferred that the bearing members 26, constructed either of wood or any other suitable material, will be horizontally bored and provided, in duplicate, for securement by means of U-bolts 28 to the axle 14. What is hereinafter referred to as the tie bar 30 is constructed in two similar parts having reduced shank portions 32 which are clamped together by means of a clamp block member 34 having two bores to receive the shank portions and a pair of set screws 36 adapted for use in clamping the shank portions 32 within the block 34 so as to adapt the overall length of the tie bar assembly for use with different types of vehicles. The enlarged ends of the tie bars 30 are split, as illustrated at 36, and bored as at 38 to receive the depending arm members 40. The ends of the tie rod are split and clamping bolts 39 are associated therewith so that the arms 40 are loosely held in the split ends of the tie bar, and collars 43 with set screws 45 are provided on the arms to abut the upper surfaces of the tie bar and to limit the downward movement of the arms so that the arms are held at a predetermined distance above the road surface. It will, of course, be understood that the tie bars 30 are inserted from the ends of the axle after the bearing members 26 have been secured thereon and that the bores in the bearing members 26 are disposed to allow the tie bar 30 to assume a substantially horizontal position, and that the vertical adjustment of the members 40 within the ends of the tie bars 30 may be made to make this device extremely sensitive to the partial deflation of a tire, or the depending arms 40 may be adjusted so that no signal will be given until one end of the axle 14 is lowered considerably below the normal height thereof above the road surface.

There are two of these arms 40 and the portions of these arms extending above the tie bar 30 should be sufficient to allow considerable adjustment for different sized tires and for wear. An arm 41 fixed to or integral with the tie bar 30 is provided with eye members 42 on the upper end of this arm. A pair of helical springs 44 are terminally secured to these eye members and chains 46 are secured to the other ends of these springs. One of the chains 46 is terminally secured to a bracket 48 secured to one of the side frame members 12 of the chassis, while the other chain is secured to a plunger element 50 of an electrical switch 52.

The switch 52 may be of any suitable character to control the closing of an electrical circuit through the leads 54, and this switch will ordinarily be rigidly mounted upon a bracket 56 secured to one of the side frame members 12. One of the leads 54 is grounded to the chassis as at 58 and the other lead is extended as indicated at 60 across the universal drawbar linkage means 22 where a disconnect plug 72 is provided, and forwardly in the towing vehicle 20 for connection to a lamp 64 on the instrument board of the towing vehicle and from said lamp 64 to the ammeter 62. It is preferred that this circuit be connected with the ammeter and the lamp 64 in series, so that a double signal will be given by the deflection of the ammeter and the lighting of the lamp 64 when a tire is deflated to an extent allowing the lower end of an arm 40 to contact the ground. The drawing illustrates the insertion of a fuse 66 and the necessary complement of a battery 68 in this circuit. It will be noted that this invention is of a character which may be secured to nearly all types of axles and that the normal complement of shock absorber equipment, braking equipment, and the like need not be altered to accommodate this device. Means such as cotter pins 70 may be incorporated with the upper end portions of the bars 40 to prevent the same from being lost should these bars become loosened from the collars 43 abutting the tie bar 30. In a simplified form of this invention the tie bar is of one-piece construction as indicated in Figures 1 and 3.

The operation of this invention will be clearly understood from the foregoing description of the mechanical details thereof, taken in connection with the above recitation of the objects sought to be achieved by this invention, but in recapitulation, it may be noted that when a tire becomes unduly deflated, the lower end of one of the arms 40 will contact the road surface, probably in an intermittent manner, to provide an intermittent signal on the ammeter and the light 64, with the obvious result that the driver is advised of the lack of pressure in the tire concerned and with this forewarning he will ordinarily be able to effect repair or further inflation before serious damage is done to the tire.

Obviously, many and various minor variations may be made in the details of construction and proportionment of the various elements of this invention, and though there has been shown a particular embodiment of this invention, this application is not limited to this particular embodiment but it is desired to include in the scope of the invention the construction, combination and arrangement of parts and portions substantially as set forth in the appended claims.

Having described the invention, what is claimed as new is:

1. A circuit closer for use with a tire deflation signal apparatus, comprising a tie bar rotatably securable to an axle of a vehicle, said tie bar being sectional and adjustable as to length and having bearings on the ends of the tie bar, depending arms carried in said bearings, collars on said arms above said bearings and adjustable on the arms to vary the distance said arms depend beneath the axle, springs connected between upper portions of said arms extending above said tie bar and adjacent portions of the vehicle to bias said arms into substantially upright position, one of said springs having an electric switch connected therewith.

2. A circuit closer for use with a tire deflation signal apparatus, comprising a tie bar rotatably securable to an axle of a vehicle, said tie bar being sectional and adjustable as to length and having bearings on the ends of the tie bar, depending arms carried in said bearings, collars on said arms above said bearings and adjustable on the arms to vary the distance said arms depend beneath the axle, springs connected between upper portions of said arms extending above said tie bar and adjacent portions of the vehicle to bias said arms into substantially upright position, one of said springs having an electric switch connected therewith, said bearings being split bearings, and clamping bolts for said bearings, whereby said arms may alternatively be rigidly secured to the tie bar when desired.

3. A device according to claim 2 and including means secured to the upper ends of said arms to prevent their detachment from said collars in the event said collars become loosened from said arms.

CHARLES T. PRATT.

REFERENCES CITED

The following references are of record in the file of this patent:

UNITED STATES PATENTS

| Number | Name | Date |
|---|---|---|
| 1,896,955 | Higley | Feb. 7, 1933 |
| 2,260,648 | Testori | Oct. 28, 1941 |

FOREIGN PATENTS

| Number | Country | Date |
|---|---|---|
| 762,936 | France | Apr. 20, 1934 |